(12) United States Patent
Evans et al.

(10) Patent No.: US 6,602,638 B1
(45) Date of Patent: Aug. 5, 2003

(54) SEALING STRUCTURE FOR TERMINAL POSTS OF BATTERIES

(75) Inventors: Rhodri Wyn Evans, Monmouthshire (GB); Paul John Rendell, Bristol (GB); Roger James Knight, Newnham (GB)

(73) Assignee: Hawker Energy Products Limited, South Wales (GB)

( * ) Notice: Subject to any disclaimer, the term of this patent is extended or adjusted under 35 U.S.C. 154(b) by 0 days.

(21) Appl. No.: 09/623,959

(22) PCT Filed: Mar. 3, 1999

(86) PCT No.: PCT/GB99/00641

§ 371 (c)(1),
(2), (4) Date: Dec. 4, 2000

(87) PCT Pub. No.: WO99/46826

PCT Pub. Date: Sep. 16, 1999

(30) Foreign Application Priority Data

Mar. 12, 1998 (GB) .............................................. 9805157
Aug. 7, 1998 (GB) .............................................. 9817123

(51) Int. Cl.[7] .......................... H01M 2/02; H01M 2/06; H01M 2/08
(52) U.S. Cl. ........................ 429/181; 429/65; 429/183; 429/184
(58) Field of Search .................. 429/65, 161, 178–181, 429/183, 184, 185

(56) References Cited

U.S. PATENT DOCUMENTS

| | | | |
|---|---|---|---|
| 3,775,730 A | * | 11/1973 | Rowls et al. |
| 4,006,282 A | * | 2/1977 | Antoine ........................ 429/181 |
| 4,215,187 A | * | 7/1980 | Gnida et al. .................. 429/161 |
| 4,245,014 A | | 1/1981 | Veit, Jr. et al. .............. 429/181 |
| 4,898,795 A | * | 2/1990 | Stocchiero .................... 429/66 |
| 5,380,603 A | | 1/1995 | Hooke .......................... 429/180 |

FOREIGN PATENT DOCUMENTS

| | | | |
|---|---|---|---|
| GB | 744277 | 2/1956 | |
| GB | 1 475 972 | 6/1977 | ............ H01R/5/08 |
| WO | WO9715085 | 4/1997 | ............ H01M/2/30 |

* cited by examiner

*Primary Examiner*—Patrick Ryan
*Assistant Examiner*—Tracy Dove
(74) *Attorney, Agent, or Firm*—Myers Bigel Sibley & Sajovec

(57) ABSTRACT

A battery, particularly of the lead acid type, has two terminals (4), one connected to the positive plates and the other to the negative plates. Each terminal (4) is located in an aperture in the battery lid (2) and a seal (10) located under the lid (2) surrounds the respective terminal (4). A space is also defined around each terminal and contains settable material such as epoxy resin cement in a set condition.

30 Claims, 2 Drawing Sheets

SEALING STRUCTURE FOR TERMINAL POSTS OF BATTERIES

FIELD OF THE INVENTION

This invention relates to a battery, particularly but not exclusively of the lead acid type.

BACKGROUND OF THE INVENTION

In a known battery construction the positive and negative plates respectively are electrically connected together and respectively to positive and negative terminals by means of connecting straps. The plates are positioned in a box-like container, usually of moulded plastics material, and a lid is placed on top of the box, the terminals projecting through respective apertures in the lid. The lid is sealed to the box using a suitable cement or by heat-sealing and the terminals are sealed within the respective apertures to prevent unwanted leakage of fluid e.g. acid, fumes or gases such as hydrogen It is also known to use a settable material such as an epoxy resin to seal the terminals in their respective apertures, but nevertheless leakages can and do occur.

SUMMARY OF THE INVENTION

It an object of the present invention to provide an improved construction which does not suffer from or suffers less from this disadvantage.

In accordance with the invention a battery comprises positive and negative plates, two connecting straps, one connected to the positive plates and the other to the negative plates, the plates and straps being enclosed in a box with a lid, two terminals, each one projecting from a respective connecting strap through a respective aperture in the lid, two zones on the underside of the lid each one surrounding one of the two apertures and facing an upper surface of the respective strap, two compressible seals, each one surrounding a respective aperture and being compressibly located between the respective zone and the facing upper surface of the strap, and two spaces, each one being defined around a respective terminal interiorly of the respective aperture, each space containing settable material in a set condition.

Preferably each seal, which may be a sealing ring, is compressed by a predetermined amount and may be retained within a groove which surrounds the respective aperture. The groove may have an overall predetermined depth less than the height of the seal and may be formed either wholly in the zone or wholly in the upper surface of the strap, or partly in the zone and partly in the upper surface of the strap. When the zone is in contact with the upper surface of the strap, the seal is compressed from its natural height to a height equal to the depth of the groove. The amount of compression is thereby predetermined.

Preferably retaining means is provided for each terminal to ensure that the upper surface of the respective strap and the respective zone remain in contact and that the compression of the seal is maintained. The retaining means may comprise a screw-threaded collar positioned on an externally screw-threaded portion of the respective terminal, a lower part of the collar contacting a region of the lid above the aforementioned zone.

At least one channel may be provided for enabling settable material to be fed to the space around each terminal, especially when the retaining means is maintaining the compression of the seal. The channel may be provided in the retaining means and/or in the lid.

The apertures may each be positioned at the base of a respective recess formed in the lid and the retaining means e.g. the collar is positioned wholly within the recess. Settable material may surround the retaining means.

Each terminal may have a lower part which is embedded in the material of the respective strap, the lower part comprising a flanged base portion and a narrower neck portion above the base portion.

BRIEF DESCRIPTION OF THE FIGURES

One embodiment of the invention will now be described by way of example only with reference to the accompanying drawings of which.

DETAILED DESCRIPTION OF THE INVENTION

Figure 1:
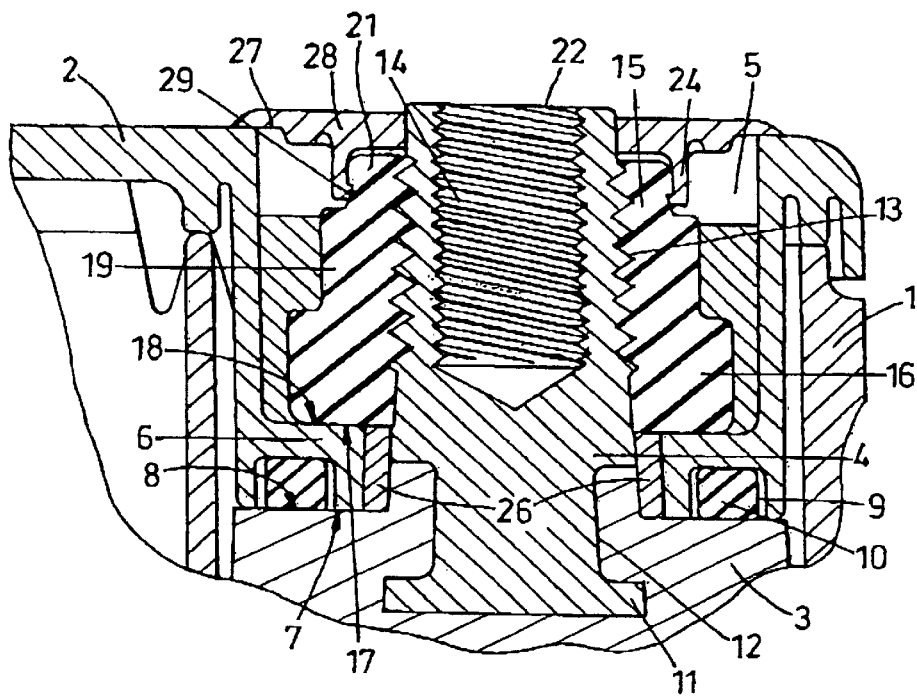
FIG. 1 shows a cross-section through part of a lead acid battery in accordance with the invention.
Figure 2:
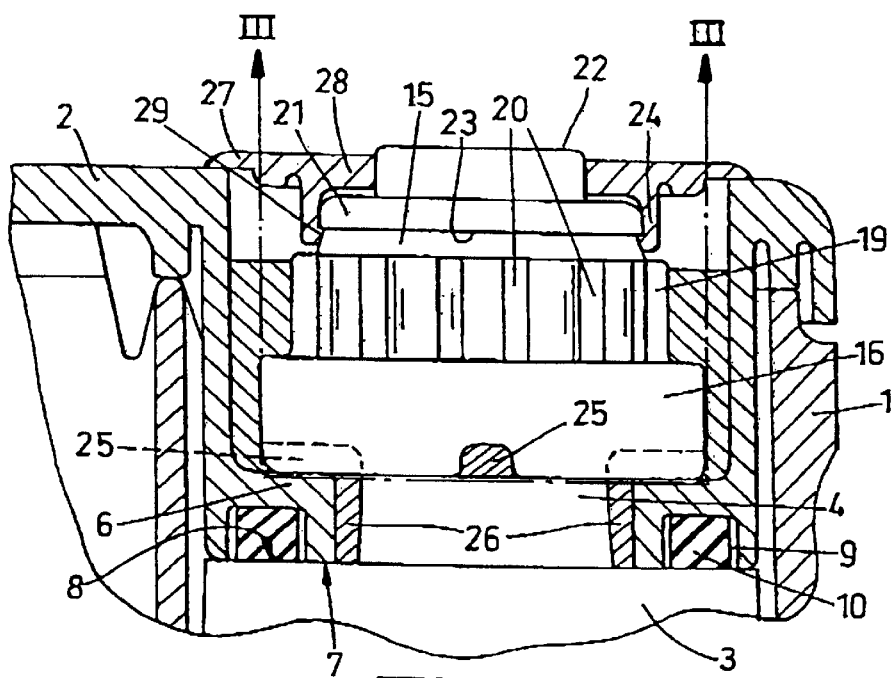
FIG. 2 shows a similar view to FIG. 1 but the side view of the terminal, collar and upper part of the strap being shown.
Figure 3:
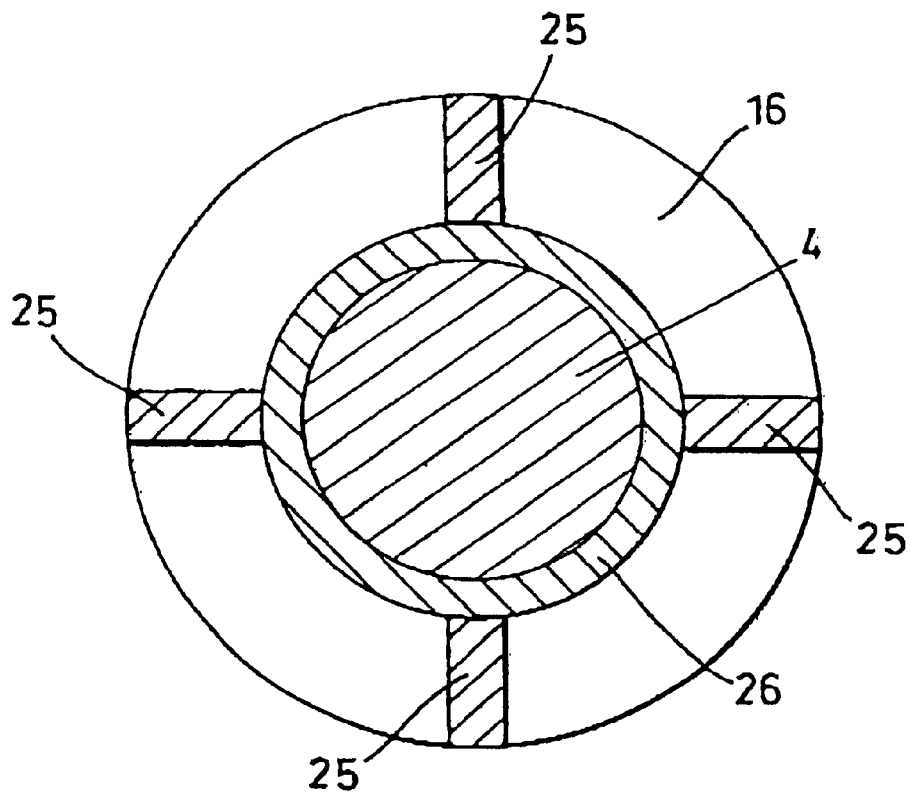
FIG. 3 shows a sectional view on line III—III of FIG. 2.

The battery according to the invention comprises a box 1 containing positive and negative plates (not shown) and a lid 2 secured to the box by a suitable bonding agent such as an epoxy resin cement. Alternatively the lid may be secured to the box by heat sealing.

The positive and negative plates respectively are connected by means of lead connecting straps 3. These are formed in a conventional manner by casting so that lugs on the corners of the plates (not shown) and a lower part of a plated terminal 4 are embedded within the respective strap 3.

The lid 2 is shaped to have two recesses 5, at the base 6 of each of which is an aperture through which one of the terminals 4 protrudes. Underneath the base 6 is a zone comprising a horizontal surface 7 which contacts an upper horizontal surface 8 of the strap 3. Formed within the zone at the base of the recess is an annular groove 9 having a generally rectangular cross-section which encircles the aperture. A seal in the form of a generally square cross-sectional elastomeric sealing ring 10 which has a natural height more than the depth of the groove 9 is compressed and retained within the groove 9 by contact with the upper surface 8 of the strap 3. By making the depth of the groove 9 a predetermined amount less than the natural height of the ring 10, the amount of compression of the sealing ring is predetermined and controlled.

The terminal 4, machined from a copper alloy such as brass, has a hexagonal flange 11 at its base, and immediately above the flange, a neck portion 12. Lead from the strap 3 enters and fills the neck portion 12 during casting so that the terminal 4 is securely located. The terminal 4 is generally cylindrical, part of the outer surface being formed with a screw thread 13. Extending part of the way inside and from the top of the terminal 22 is an internally screw-threaded bore 14 for receiving a cable end (not shown).

An internally threaded collar 15 of moulded plastics material such as ABS is located on the terminal 4. The lower part 16 of the collar has a smooth outer surface and is wider than the remainder. The under surface 17 of the collar contacts the upper surface 18 of the base 6 of the recess 5 encircling the terminal aperture and by tightening the collar 15 the zone 7 of the base correctly engages the upper surface 8 of the strap 3 and the seal 10 is compressed by the required amount. Short radially extending channels 25 are provided on the underside 17 of the collar 16 enabling settable epoxy resin to be poured into the recess 5 and flow into the space below the collar 16 surrounding the terminal 4 above the upper surface of the strap 3 to form a ring 26, which is allowed to set. Channels (not shown) may alternatively or additionally be formed in the upper surface 18 of the base 6.

The collar 15 has a central part 19 immediately above the lower part 16 which is formed with vertical ribs 20 to enable the collar 15 to be gripped firmly and tightened or loosened as required. Above the central part 19 is an upper portion 21 having an undercut shoulder 23 encircling the collar. This retains a separate cap 27 which has a top part 28 and a cylindrical part 24 which covers the top of the collar, the cylindrical part having an inwardly-projecting lip 29 which engages the undercut shoulder 23 In a snap-fit arrangement. The top part 28 covers the recess 5, which is part filled with epoxy resin, but has a central aperture through which the top 22 of the terminal projects slightly.

When assembling the battery seals 10 are each placed in a respective groove 9, one for each terminal 4. The edges of the lid are covered in a suitable bonding agent e.g. epoxy resin and the lid lowered on to the box with each terminal projecting through its respective aperture in the base of a recess. A collar 16 is placed on to each terminal and screwed down tightly, causing the seal 10 to be compressed and the undersurface zone 7 of the base to firmly contact the upper surface of the strap. Epoxy resin is then poured into the recess. Some flows down the side of the collar, through the grooves 25 on its under surface and to fill the space between the inner side of the aperture and the outer side of the terminal. This is shown at 26 in the drawings.

The ring of resin so formed adheres to the lower part of the terminal, to the strap and to the lid to provide a secondary seal i.e. a safeguard if the elastomeric seal 10 falls. The adhesion of the resin to the lead (of the strap and terminal) and the ABS (of the lid) forms an effective barrier against acid transport, hence limiting corrosion.

Enough resin is poured into the recess to reach a height approximately level with the top of the collar. When the resin is set, the collar is effectively locked in position on the terminal. The cap 27 is then placed on the collar to cover the recess 5.

This construction provides for reduced terminal corrosion and higher sealing integrity, thus leading to longer battery life.

What is claimed is:

1. A battery comprising positive and negative plates, two connecting straps (3), one connected to the positive plates and the other to the negative plates, the plates and straps (3) being enclosed in a box (1) with a lid (2), and two terminals (4), each one projecting from a respective connecting strap (3) through a respective aperture in the lid (2), characterised by further comprising two zones (7) on the underside of the lid (2), each one surrounding one of the two apertures and facing an upper surface (8) of the respective strap (3), two compressible seals (10) each one surrounding a respective aperture and being compressibly located between the respective zone (7) and the facing upper surface (8) of the strap (3), and two spaces each one being defined around a respective terminal interiorly of the respective aperture, each space containing settable material in a set condition, wherein each seal is contained within a groove that surrounds the respective aperture, and wherein the groove is formed wholly in the upper surface of the strap.

2. A battery according to claim 1 characterised in that each seal (10) comprises a sealing ring.

3. A battery according to claim 1 characterised in that each seal (10) is compressed by a predetermined amount.

4. A battery according to claim 1 characterised in that the groove (9) has an overall predetermined depth less than the height of the seal (10).

5. A battery according to claim 1 characterised in that the groove (9) is formed wholly in the zone (7).

6. A battery according to claim 1 characterised by comprising at least one channel (25) for enabling settable material to be fed to the space around the respective terminal.

7. A battery according to claim 6 characterised in that at least one channel (25) is provided by the retaining means.

8. A battery according to claim 6 characterised in that at least one channel (25) is provided by the lid (2).

9. A battery according to claim 1 characterised in that the apertures are each positioned at the base (6) of a respective recess (5) formed in the lid (2) and the retaining means (15) is positioned wholly within the recess (15).

10. A battery according to claim 1 characterised in that settable material surrounds the retaining means (15).

11. A battery according to claim 1 characterised in that each terminal (4) has a lower part which is embedded in the material of the respective strap (3), the lower part comprising a flanged base portion (11) and a narrower neck portion (12) above the base portion (11).

12. A battery according to claim 9 characterised by a cap comprising a top part covering the recess in the lid and a cylindrical part covering the top of the retaining means.

13. A battery according to claim 12 characterised in that the upper portion of each retaining means is provided with an undercut shoulder which engages with an inwardly projecting lip provided in the cylindrical part of the cap to secure the cap in a snap fit arrangement.

14. A battery comprising positive and negative plates, two connecting straps (3), one connected to the positive plates and the other to the negative plates, the plates and straps (3) being enclosed in a box (1) with a lid (2), and two terminals (4), each one projecting from a respective connecting strap (3) through a respective aperture in the lid (2), characterised by further comprising two zones (7) on the underside of the lid (2), each one surrounding one of the two apertures and facing an upper surface (8) of the respective strap (3), two compressible seals (10) each one surrounding a respective aperture and being compressibly located between the respective zone (7) and the facing upper surface (8) of the strap (3), and two spaces each one being defined around a respective terminal interiorly of the respective aperture, each space containing settable material in a set condition, wherein each seal is contained within a groove which surrounds the respective aperture, and the groove is formed partly in the zone and partly in the upper surface of the strap.

15. A battery according to claim 14, characterized in that each seal comprises a sealing ring.

16. A battery according to claim 14, characterized in that each of the apertures is positioned in the base of a respective recess formed in the lid, further comprising retaining means for each terminal that ensures that the upper surface of the respective strap and the respective zone remain in contact and that the compression of the seal is maintained, the retaining means being positioned wholly within the recess.

17. A battery comprising positive and negative plates, two connecting straps (3), one connected to the positive plates and the other to the negative plates, the plates and straps (3) being enclosed in a box (1) with a lid (2), and two terminals (4), each one projecting from a respective connecting strap (3) through a respective aperture in the lid (2), characterised by further comprising two zones (7) on the underside of the lid (2), each one surrounding one of the two apertures and facing an upper surface (8) of the respective strap (3), two compressible seals (10) each one surrounding a respective aperture and being compressibly located between the respective zone (7) and the facing upper surface (8) of the strap (3), and two spaces each one being defined around a respective terminal interiorly of the respective aperture, each space containing settable material in a set condition, and further comprising retaining means for each terminal which ensures that the upper surface of the respective strap and the respective zone remain in contact and that the compression of the seal is maintained, and wherein the retaining means comprises a screw-threaded collar positioned on an externally screw-threaded portion of the respective terminal, a lower part of the collar contacting a region of the lid above the zone.

18. A battery according to claim 17, characterized in that each seal comprises a sealing ring.

19. A battery according to claim 17, characterized in that each of the apertures is positioned in the base of a respective recess formed in the lid, and each collar is positioned wholly within the recess.

20. A battery comprising positive and negative plates, two connecting straps (3), one connected to the positive plates and the other to the negative plates, the plates and straps (3) being enclosed in a box (1) with a lid (2), and two terminals (4), each one projecting from a respective connecting strap (3) through a respective aperture in the lid (2), characterised by further comprising two zones (7) on the underside of the lid (2), each one surrounding one of the two apertures and facing an upper surface (8) of the respective strap (3), two compressible seals (10) each one surrounding a respective aperture and being compressibly located between the respective zone (7) and the facing upper surface (8) of the strap (3), and two spaces each one being defined around a respective terminal interiorly of the respective aperture, each space containing settable material in a set condition, wherein each of the spaces is separated from its respective seal by a wall extending between a zone (7) and the facing upper surface of the strap (3).

21. A battery according to claim 20, wherein the wall is unitarily formed with the lid.

22. A battery according to claim 20, characterized in that each seal comprises a sealing ring.

23. A battery according to claim 20, characterized in that each of the apertures is positioned in the base of a respective recess formed in the lid, further comprising retaining means for each terminal that ensures that the upper surface of the respective strap and the respective zone remain in contact and that the compression of the seal is maintained, the retaining means being positioned wholly within the recess.

24. A battery according to claim 20, characterized in that each seal is contained within a groove which surrounds the respective aperture and is positioned radially outwardly from the wall.

25. A battery according to claim 24, characterized in that the groove is formed wholly in the zone formed in the underside of the lid.

26. A battery comprising positive and negative plates, two connecting straps (3), one connected to the positive plates and the other to the negative plates, the plates and straps (3) being enclosed in a box (1) with a lid (2), and two terminals (4), each one projecting from a respective connecting strap (3) through a respective aperture in the lid (2), characterised by further comprising two zones (7) on the underside of the lid (2), each one surrounding one of the two apertures and facing an upper surface (8) of the respective strap (3), two compressible seals (10) each one surrounding a respective aperture and being compressibly located between the respective zone (7) and the facing upper surface (8) of the strap (3), and two spaces each one being defined around a respective terminal interiorly of the respective aperture, each space containing settable material in a set condition, wherein compression of the seal is provided by a collar that is attached to a respective terminal, each collar including channels that provide fluid communication between a respective space and a volume located radially outwardly of the collar.

27. A battery according to claim 26, characterized in that each seal comprises a sealing ring.

28. A battery according to claim 26, characterized in that each of the apertures is positioned in the base of a respective recess formed in the lid, further comprising retaining means for each terminal that ensures that the upper surface of the respective strap and the respective zone remain in contact and that the compression of the seal is maintained, the retaining means being positioned wholly within the recess.

29. A battery according to claim 26, characterized in that each seal is contained within a groove which surrounds the respective aperture.

30. A battery according to claim 29, characterized in that the groove is formed wholly in the zone formed in the underside of the lid.

* * * * *